May 9, 1939.    L. URGE    2,157,361
MOTOR VEHICLE LIGHT
Filed April 13, 1936
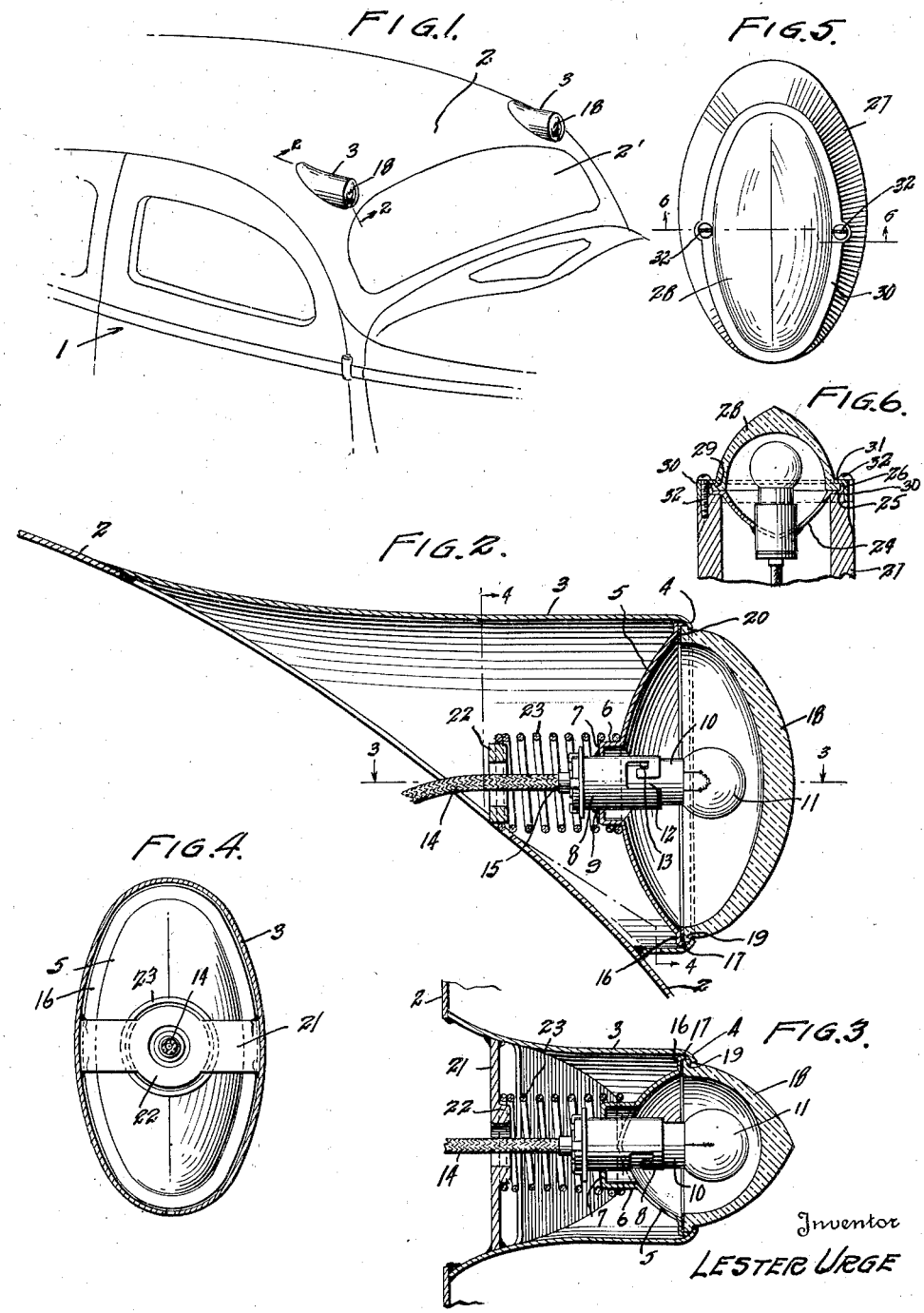
Inventor
LESTER URGE
By Semmes & Semmes
Attorney Patented May 9, 1939

2,157,361

UNITED STATES PATENT OFFICE 2,157,361

MOTOR VEHICLE LIGHT

Lester Urge, Youngstown, Ohio

Application April 13, 1936, Serial No. 74,181

2 Claims. (Cl. 240—7.1)

This invention relates to light projecting apparatus, and more particularly to lights for motor vehicles.

Heretofore, motor vehicle lights have had certain undesirable features. In general, the positioning of the lights has been unsatisfactory in that they have been located too low upon the vehicle. Furthermore, the prior lights have been relatively difficult to assemble and disassemble and to maintain in assembled relationship.

One of the objects of my invention is to overcome the above mentioned objectionable features.

An important object of my invention is to provide a light for a motor vehicle which consists of few essential parts.

Another object of my invention is a motor vehicle light which can be assembled and disassembled in a minimum of time.

Still another object of my invention is an automobile light which is resiliently held in operative position.

Yet another object of my invention is an automobile light which can be assembled without the use of tools.

A further object of my invention is a motor vehicle having lights positioned on the top immediately above the wind-shield.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration.

In the drawing:

Figure 1 is a view showing my lights positioned on the top of a motor vehicle.

Figure 2 is a view taken along the line 2—2 of Figure 1, looking in the direction of the arrows.

Figure 3 is a view taken along the line 3—3 of Figure 2, looking in the direction of the arrows.

Figure 4 is a view taken along the line 4—4 of Figure 2, looking in the direction of the arrows.

Figure 5 is a front view of a modified form of my invention.

Figure 6 is a view taken along the line 6—6 of Figure 5.

Referring to the drawing, in which like numerals refer to similar parts, and particularly to Figure 1, I have shown a motor vehicle designated generally 1. Mounted upon the downwardly sloping portion 2 of the top, and immediately above the windshield 2', are a pair of light casings 3. The light casing is so formed as to conform to the curvature of the top of the car. I have found that in making the light casing of substantially elliptical shape, a very attractive and efficient light is afforded.

The casing 3 may be welded or brazed into the top to form an integral portion thereof, or else it can be made separately and secured to the top in any suitable manner. In the event it is desired to make the casing separately, a rubber gasket should be employed therewith to prevent any damaging of the top of the car. It is believed apparent that, in so positioning and forming the light casing, there is afforded a distinctive decorative light which is also well adapted for parking or other purposes.

As best shown in Figure 3, the open end of the light casing 3 is bent inwardly as indicated at 4. I prefer that the portion 4 be nickel or chrome plated; the purpose of which will be hereinafter discussed more fully.

Mounted within the casing is a reflector 5 of the same configuration as the casing. The reflector 5 is bent outwardly as at 6 and is provided with a flanged portion 7. The reflector 5 is suitably secured to a sleeve 8 by welding the flange 7 thereto, as indicated at 9. The sleeve 8 serves as a socket for receiving the base 10 of a lamp bulb 11. Bayonet slots 12 are provided in the sleeve for receiving the pins 13 which project from the sides of the base of the bulb. A conductor 14 is attached to the bottom of the sleeve 8 by means of a collar 15.

The outer edge of the reflector 5 is provided with an annular rim 16 having an inturned portion 17. The lens 18 is of the same shape as the reflector and is substantially bullet-shaped in cross section, as best depicted in Figure 3. I have found that, in having the lens of this configuration, it not only affords an attractive decorative light but also facilitates the insertion in and removal of the lens from the casing. The lens 18 is also provided with a flanged portion 19 which is adapted to rest upon the annular rim 16 of the reflector 5 when the light is in operative position. A gasket 20 of suitable yielding material is interposed between the reflector and the lens.

Positioned in the rear portion of the casing 3 is a transversely extending support element 21, which can be secured to the sides of the casing in any suitable manner. An annular flange 22 is provided on the support 21.

A spiral spring 23 is interposed between the back of the reflector 5 and the support 21. As can be seen in Figure 3, the inwardly bent portion 6 of the reflector 5, and the flanged portion 22 on the support 21 serve as guides to hold the spring in proper position. The spring 23 is of sufficient strength to force the reflector outwardly toward the lens 18 and force the latter into engagement with the inturned edges 4 of the casing 3. As heretofore pointed out, the inturned portions of the casing are nickel or chrome plated for preventing any damaging or marring of this portion of the casing when the lens is either inserted or removed, and for preventing rusting of the casing.

It will be readily appreciated that the lens and reflector are held in close contact with the portion 4 of the casing, due to the pressure exerted by the spring on the back of the reflector. This will prevent any rattling of the reflector and the lens and will keep the interior of the casing free from water, dirt or other foreign matter.

When it is desired to disassemble the light, the lens 18 is forced inwardly against the action of the spring, which in turn forces the reflector 5 inwardly. As soon as the lens has been depressed sufficiently within the casing, the lens is turned approximately 90° and removed therefrom. It is believed apparent that I have devised an economical vehicle lamp which is held in operative position without using a retaining band to scure the lens to the casing. Obviously, the lamp can be assembled or disassembled in a minimum time, without employing any tools, such as a screwdriver.

In Figures 5 and 6 I have depicted another form of my invention, in which a band is employed for holding the lens in place. In this embodiment, the reflector 24 is provided with an annular rim portion 25 which terminates in a flange 26. The reflector 24 is permanently secured to the open end of the casing 27 by any suitable method. The lens 28 is also provided with a flanged portion 29 which is adapted to rest on the rim 25 of the reflector. A band 30 having an inturned edge 31 for engaging the flange of the lens is fitted thereover, and is secured to the casing by means of screws 32.

From the foregoing, it is apparent that I have devised a motor vehicle light of few essential parts and which can be easily and cheaply manufactured. Due to the simplicity of the lamp structure, it is possible to quickly replace the parts without the necessity of using tools. Furthermore, the preferred form of light can be held in operative position without employing a retaining band for securing the lens to the casing. It will further be appreciated that by positioning a spring in back of the reflector and by having the lens of the shape disclosed, I am able to keep these members in close contact, thereby preventing any rattling of the light or entry of foreign matter within the interior of the casing.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a headlight for a motor vehicle, a tubular casing having an elliptically shaped front opening and inturned edges defining said front opening, the rear of said casing sloping upwardly and rearwardly to conform to the lines of the top of the said motor vehicle, a reflector mounted within the casing, the central portion of said reflector being bent to form a rearwardly extending flange, a bulb mounted on the reflector, an outwardly projecting elliptically shaped convex lens carried by the front opening of said tubular casing, a strap support extending transversely across the tubular casing and having an annular flange mounted thereon, said strap portion and flange containing an aperture through which passes a wire to furnish current to the said bulb, and a spiral spring mounted on the said flange and interposed between the said support and the reflector and bearing against the centrally located flange on the rear of the reflector for urging the reflector and lens outwardly against the inturned edges of the casing.

2. In a headlight for a motor vehicle, a tubular casing having an elliptically shaped front opening and inturned edges defining said front opening, the rear of said casing sloping upwardly and rearwardly to conform to the lines of the top of said motor vehicle, a reflector, having a flange on its outer periphery, mounted within the casing, the central portion of said reflector being bent to form a rearwardly extending flange, a bulb mounted on the reflector, an elliptically shaped outwardly projecting convex lens provided with a flange on its outer periphery, said lens being adapted to be inserted into the tubular casing in such a manner that the said flange on the lens is positioned between the flanged portion on the outer periphery of the reflector and the inturned portion of the tubular casing, a strap support forming the back of the tubular casing extending transversely across the tubular casing and having an annular flange mounted thereon, said strap portion and flange containing an aperture through which passes a wire to furnish current to the said bulb, and spring means mounted on the said flange and interposed between the said support and the reflector and bearing against the centrally located flange on the rear of the reflector thereby urging the reflector and lens outwardly against the inturned edges of the casing.

LESTER URGE.